De W. C. BROWN.
Coffee-Pots.

No. 149,288. Patented April 7, 1874.

Attest.
J. Mason Crozier
Seth H. Jamieson

Inventor.
DeWitt C. Brown
By N. Cramford atty.

UNITED STATES PATENT OFFICE.

DE WITT C. BROWN, OF NEW YORK, N. Y.

IMPROVEMENT IN COFFEE-POTS.

Specification forming part of Letters Patent No. 149,288, dated April 7, 1874; application filed November 11, 1873.

*To all whom it may concern:*

Be it known that I, DE WITT C. BROWN, of New York city, in the county and State of New York, have made certain Improvements in Coffee-Pots, in which coffee, tea, and other aromatic seeds, herbs, or roots may be boiled or decocted, of which the following is a specification:

In the making of coffee or tea, to have the same made in the shortest time, of the greatest strength, and retain its natural aroma, is what is desired by those who make or drink it, and the object of this invention is to produce such a vessel, and its attendant devices, as will successfully accomplish the object; and it consists in the construction and arrangement of the parts that are employed in connection with the pot, as will be fully hereinafter described.

Figure 1:
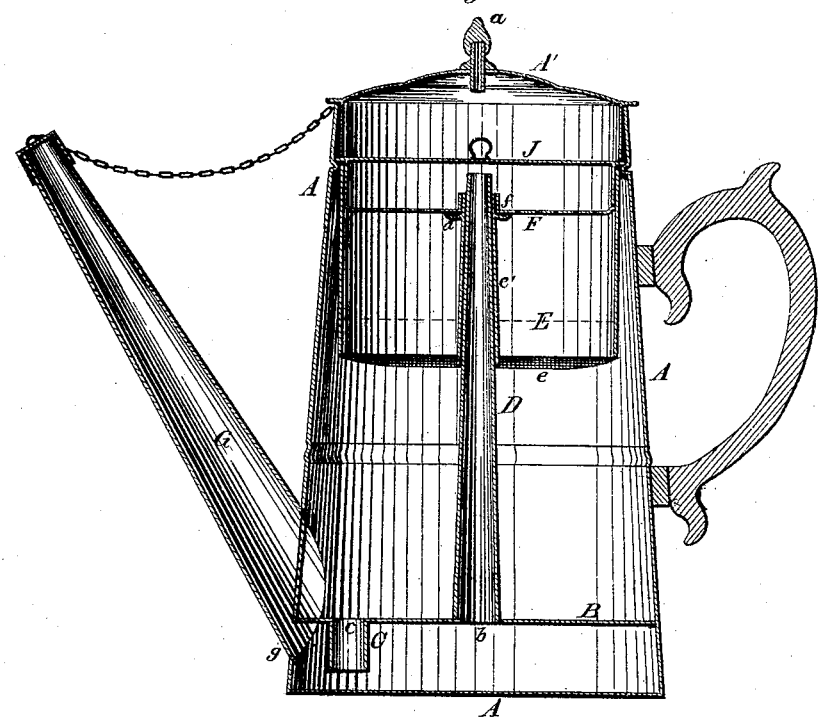
Figure 2:
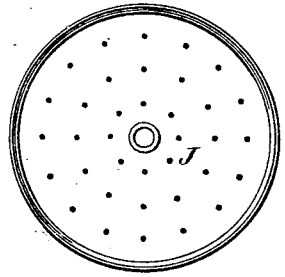
Figure 3:
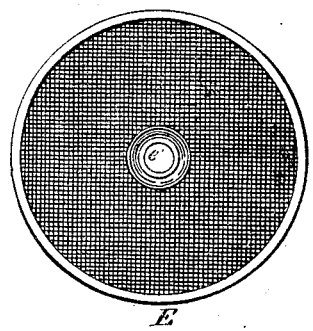

In the drawings, Figure 1 is a sectional view of the pot and the parts contained therein, and Figs. 2 and 3, details.

A represents the body of an ordinary coffee-pot, with its removable cover A'. B is a secondary fixed bottom, located at a little distance above the main bottom of the pot—say, three-fourths of an inch, more or less, according to the capacity of the pot. C is a tube, made fast in an opening, $c$, in bottom B, and extends downward to about one quarter of an inch above the lower bottom of the body A, or just far enough to discharge the water from above the secondary fixed bottom B, to supply water to a steam or hot-water jet-tube while the coffee is making, and to supply the drain-spout while the coffee is being poured out of the coffee-pot. D is a hot-water or steam jet-tube, rising perpendicularly from the center of the secondary bottom B to a proper height near to the top of the body A. This tube is conical or tapering, as it extends upward, and is fixed to bottom B over an opening, $b$. E is the coffee-holder, suspended in the coffee-pot by an outwardly-projecting flange on the top edge of the sides, and resting on an inwardly-projecting bead that is indented in the body A, and has a conical tube, $e'$, that goes over tube D, and extends upward nearly to its top. $e$ is the perforated bottom of holder E, with openings small enough to prevent any of the ground coffee from passing through it, but large enough to allow the necessary water to filter through the coffee, and through the perforations in this bottom. F is a perforated diaphragm or shower-plate, fitting into the upper part of the coffee-holder, and held in its place by an eye, $f$, that surrounds the tube D, and rests upon a projecting ledge, $d$, on tube D. J is a lid that covers the coffee-holder, diaphragm, and tube D, and fits closely upon the top of the coffee-holder E. G is the ordinary pouring-spout, but placed near to the bottom of the body of the pot, and so that all the coffee decotion is drawn from below the secondary fixed bottom B, through the opening $g$. In the lid A' is a tube, opening from above the lid J, through the top A, into knob $a$, which is screwed upon the tube, and in which a valve may be placed to regulate the escape of steam when necessary.

The operation of this device in making coffee is as follows: Water is first put into the pot by taking off the lid A' and taking out lid J and coffee-holder E, of such quantity as is necessary; then put the quantity of coffee into the holder E, and the lids J and A' in their places; then put the pot upon the place for heating. When the water in the lower part of the pot under the secondary bottom B boils, it will cause all the steam, and with it some of the hottest of the water, to overflow the top of the steam-tube D in a kind of jet, with force enough to strike against the under side of the lid J, when it is deflected in a shower in different directions upon the perforated diaphragm F, through which it passes, and falls upon the mass of ground coffee in holder E, thence percolating or passing through the ground coffee and the perforated bottom $e$, thence falling into the water in the pot below, and above the secondary bottom, carrying with it some of the coffee in solution; and as the water below the secondary bottom becomes heated, and is forced upward through tube D, the same amount is supplied from above the secondary bottom through tube C, thus keeping up a continual circulation of the water until it holds in solution the whole soluble portion of the coffee, when the pot may be removed from the fire or heater, and the coffee thus made can be poured off or out of the pot by spout G, through opening $g$, that is below the fixed secondary bottom, while tube C supplies the place of what has been discharged from the reservoir above the secondary bottom. Cold water can be used for making coffee in this pot just as well as hot, the only difference being in the time it takes to heat the water so as to force the heated water up through tube D.

Having thus described my invention, what I claim, and desire to secure by Letters Patent, is—

A coffee-pot, A, having the secondary fixed bottom B, with the hot-water tube C, steam-tube D attached thereto, lid J, diaphragm F, coffee-holder E, and drain-opening $g$, leading from below the secondary fixed bottom into spout G, the parts constructed and arranged, with relation to each other, substantially as described.

DE WITT C. BROWN.

Witnesses:
EDM. F. BROWN,
NEWTON CRAWFORD.